(12) United States Patent
Wnuk et al.

(10) Patent No.: US 9,547,678 B2
(45) Date of Patent: Jan. 17, 2017

(54) ACTIVITY RECOGNITION SYSTEMS AND METHODS

(71) Applicant: Nant Holdings IP, LLC, Culver City, CA (US)

(72) Inventors: Kamil Wnuk, Playa Del Rey, CA (US); Nicholas J. Witchey, Laguna Hills, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 23 days.

(21) Appl. No.: 14/741,830

(22) Filed: Jun. 17, 2015

(65) Prior Publication Data

US 2015/0363644 A1    Dec. 17, 2015

Related U.S. Application Data

(60) Provisional application No. 62/013,508, filed on Jun. 17, 2014.

(51) Int. Cl.
*G06K 9/00* (2006.01)
*G06F 17/30* (2006.01)
(Continued)

(52) U.S. Cl.
CPC ... *G06F 17/30321* (2013.01); *G06F 17/30345* (2013.01); *G06F 17/30598* (2013.01);
(Continued)

(58) Field of Classification Search
CPC ............ G06K 9/00335; G06K 9/00342; G06K 9/00624; G06K 9/00711; G06K 9/00771; G06K 9/469; G06K 9/6296; G06K 9/6892; G06F 17/30345; G06F 17/30598
See application file for complete search history.

(56) References Cited

U.S. PATENT DOCUMENTS

| 7,016,532 B2 | 3/2006 | Boncyk et al. ............... 382/162 |
| 7,477,780 B2 | 1/2009 | Boncyk et al. ............... 382/165 |

(Continued)

FOREIGN PATENT DOCUMENTS

| EP | 1731097 A2 | 12/2006 | ............... A61B 5/11 |
| WO | WO 2010/083562 A1 | 7/2010 | ............. G06F 19/00 |

OTHER PUBLICATIONS

International Search Report and Written Opinion issued in International Application No. PCT/US2015/036177 dated Sep. 23, 2015, 13 pages.

(Continued)

*Primary Examiner* — Andrew W Johns
(74) *Attorney, Agent, or Firm* — Mauriel Kapouytian Woods LLP; Andrew A. Noble; Michael Mauriel

(57) ABSTRACT

An activity recognition system is disclosed. A plurality of temporal features is generated from a digital representation of an observed activity using a feature detection algorithm. An observed activity graph comprising one or more clusters of temporal features generated from the digital representation is established, wherein each one of the one or more clusters of temporal features defines a node of the observed activity graph. At least one contextually relevant scoring technique is selected from similarity scoring techniques for known activity graphs, the at least one contextually relevant scoring technique being associated with activity ingestion metadata that satisfies device context criteria defined based on device contextual attributes of the digital representation, and a similarity activity score is calculated for the observed activity graph as a function of the at least one contextually relevant scoring technique, the similarity activity score being relative to at least one known activity graph.

28 Claims, 6 Drawing Sheets

(51) Int. Cl.
*G06T 11/20* (2006.01)
*G06K 9/46* (2006.01)

(52) U.S. Cl.
CPC ......... *G06K 9/00342* (2013.01); *G06K 9/469* (2013.01); *G06T 11/206* (2013.01)

(56) References Cited

U.S. PATENT DOCUMENTS

| | | | | |
|---|---|---|---|---|
| 7,565,008 | B2 | 7/2009 | Boncyk et al. | 382/165 |
| 7,680,324 | B2 | 3/2010 | Boncyk et al. | 382/165 |
| 7,823,066 | B1 | 10/2010 | Kuramura | 715/717 |
| 7,881,529 | B2 | 2/2011 | Boncyk et al. | 382/165 |
| 8,111,923 | B2 | 2/2012 | Csurka et al. | 382/190 |
| 8,954,358 | B1* | 2/2015 | Zhang et al. | G06K 9/00718 706/12 |
| 2006/0018516 | A1 | 1/2006 | Masoud et al. | 382/115 |
| 2007/0269139 | A1 | 11/2007 | Erol et al. | 382/305 |
| 2009/0324107 | A1* | 12/2009 | Walch | 382/224 |
| 2012/0170802 | A1* | 7/2012 | Millar et al. | 382/103 |
| 2013/0163864 | A1 | 6/2013 | Cavet | G06K 9/54 |
| 2014/0149418 | A1 | 5/2014 | Qin et al. | G06F 17/30958 |

OTHER PUBLICATIONS

Divvala, Santosh K., et al., "Learning Everything about Anything: Webly—Supervised Visual Concept Learning," 2014 IEEE Conference on CVPR, Jun. 23, 2014, pp. 3270-3277, IEEE.

Grosser, Benjamin, "Computers Watching Movies," http://bengrosser.com/projects/comuters-watching-movies/, 2013, 7 pages.

Wang, Heng, et al., "Action Recognition by Dense Trajectories," 2011 IEEE Conference on CVPR, Jun. 20, 2011, pp. 3169-3176, IEEE.

Wang, Ling, "Directed Acyclic Graph Kernels for Action Recognition," 2013 IEEE International Conference on ICCV, Dec. 1, 2013, pp. 3168-3175, IEEE.

Zhang, Wei, et al., "Graph Degree Linkage: Agglomerative Clustering on a Directed Graph," Computer Vision—ECCV 2012, Aug. 25, 2012, pp. 428-441, vol. 7572, Springer Berlin.

* cited by examiner

Example Client-Server Relationship

400

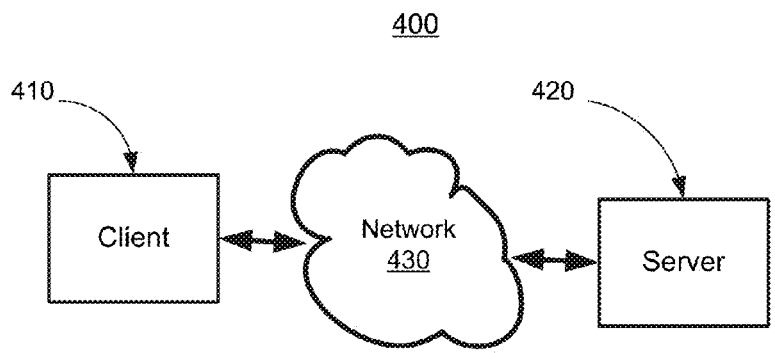

- Generate digital representation of an observed activity
- Send digital representation data to server

- Generate plurality of temporal features from the digital representation of the observed activity using a feature detection algorithm
- Establish an observed activity graph comprising one or more clusters of temporal features generated from the digital representation
- Select at least one contextually relevant scoring technique from similarity scoring techniques for known activity graphs
- Calculate a similarity activity score for the observed activity graph as a function of the at least one contextually relevant scoring technique, the similarity activity score being relative to at least one known activity graph
- Generate activity recognition result set
- Send activity recognition result set to client

Figure 4

ACTIVITY RECOGNITION SYSTEMS AND METHODS

CROSS REFERENCE TO RELATED APPLICATIONS

This application claims the benefit of U.S. Provisional Application No. 62/013,508, filed Jun. 17, 2014. The entire content of that application is hereby incorporated herein by reference.

TECHNICAL FIELD

This disclosure relates generally to activity recognition technologies.

BACKGROUND

The background description includes information that may be useful in understanding the present invention. It is not an admission that any of the information provided herein is prior art or relevant to the presently claimed invention, or that any publication specifically or implicitly referenced is prior art.

Recognizing observed activities, such as an activity represented in video data, is a very complex undertaking. Known techniques have failed to gain market penetration, especially with respect to consumer interactions. Some effort has been directed toward identifying a user's activities with respect to web interactions, as exemplified by U.S. patent application publication 2014/0149418 to Qin et al. titled "Method and System for Measuring Social Influence and Receptivity of Users", filed Nov. 28, 2012. However, the techniques disclosed by Qin are not applicable to recognizing observed activities.

Other efforts have focused on using directed graphs for activity recognition. Examples of such techniques are described in the following papers:

"Graph Degree Linkage: Agglomerative Clustering on a Directed Graph", by Zhang et al., Proceedings of European Conference on Computer Vision (ECCV), 2012 ("Zhang 2012");

"Action Recognition by Dense Trajectories", by Wang et al., CVPR 2011—IEEE Conference on Computer Vision & Pattern Recognition (2011) 3169-3176 ("Wang 2011"); and "Directed Acyclic Graph Kernels for Action Recognition", by Wang et al., 2013 IEEE International Conference on Computer Vision (ICCV) ("Wang 2013").

The above approaches do relate to recognizing observed activities through the use of specialized graphs. For example, Wang 2013 provides a foundation for recognizing activities through the use of directed acyclic graphs (DAGs). However, the computation time necessary for such an approach is prohibitive for use in consumer device applications, such as for use in cameras, cell phones, tablet computers, toys, vehicles and other consumer devices.

SUMMARY

Consumers currently lack access to applications that allow them to observe an activity such as a sporting event or a dance recital via a device (e.g., a cell phone), automatically recognize the activity, and cause the device to initiate an action based on the recognized activity. Further, current approaches fail to account for contextual circumstances that can have an impact on recognizing an activity. For example, the Wang 2013 approach lacks the contextual resolving power to discern between a dance and a fight. Thus, there remains a need for cost-effective activity recognition that is sensitive to observation context.

The inventive subject matter provides apparatus, systems and methods in which activities can be recognized via a device through using contextual scoring techniques applied to known activity graphs. In an embodiment, a plurality of temporal features is generated from a digital representation of an observed activity using a feature detection algorithm. The digital representation may comprise one or more of image data, video data, audio data, tactile data, kinesthetic data, temperature data, kinematic data and radio signal data. An observed activity graph comprising one or more clusters of temporal features generated from the digital representation is established, wherein each one of the one or more clusters of temporal features defines a node of the observed activity graph. The nodes of the observed activity graph may comprise clusters of feature trajectories. At least one contextually relevant scoring technique is selected from similarity scoring techniques for known activity graphs, the at least one contextually relevant scoring technique being associated with activity ingestion metadata that satisfies device context criteria defined based on device contextual attributes of the digital representation, and a similarity activity score is calculated for the observed activity graph as a function of the at least one contextually relevant scoring technique, the similarity activity score being relative to at least one known activity graph. The similarity scoring techniques may include at least one of a Euclidean distance, linear kernel, polynomial kernel, Chi-squared kernel, Cauchy kernel, histogram intersection kernel, Hellinger's kernel, Jensen-Shannon kernel, hyperbolic tangent (sigmoid) kernel, rational quadratic kernel, multiquadratic kernel, inverse multiquadratic kernel, circular kernel, spherical kernel, wave kernel, power kernel, log kernel, spline kernel, Bessel kernel, generalized T-Student kernel, Bayesian kernel, wavelet kernel, radial basis function (RBF), exponential kernel, Laplacian kernel, ANOVA kernel and B-spline kernel function. An activity recognition result set may be generated based on the similarity activity score.

In some embodiments, the known activity graphs and the observed activity graph may comprise directed acyclic graphs.

In some embodiments, the similarity activity score may be calculated as a function of nodes within the known activity graphs and nodes within the observed activity graph.

In some embodiments, the device contextual attributes and the activity ingestion metadata may adhere to a common namespace.

In some embodiments, the activity ingestion metadata may comprise domain-specific attributes, object attributes, or at least one of location attributes, time attributes, position attributes and orientation attributes.

In some embodiments, the feature detection algorithm may include at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithm.

In some embodiments, the known activity graphs may comprise activity graph primitives. The activity graph primitives may include at least one of an object persistence, object transformation, object-to-object conserved interaction, object segmentation, object creation, object destruction and object NULL interaction.

In some embodiments, the known activity graphs may include nodes that comprise other known activity graphs.

In some embodiments, the known activity graphs may comprise key frames.

In some embodiments, a classification may be assigned to the observed activity graph, wherein the classification comprises the activity recognition result set.

In some embodiments, the activity recognition result set may comprise an activity prediction with respect to the observed activity graph.

In some embodiments, the activity recognition result set may comprise at least one of an address, an activity identifier, a search result, a recommendation, an anomaly, a warning, a segmentation, a command, a ranking, context relevant information, content information, a promotion and an advertisement.

In some embodiments, a mapping of a static image from the digital representation may be established into a graph space of at least one of the known activity graphs by mapping image features to nodes of the at least one of the known activity graphs.

In some embodiments, an action prediction may be generated based on the mapping and the nodes of the at least one of the known activity graphs.

In some embodiments, the similarity scoring techniques may comprise at least one set of node context-based weights, and the at least one set of node context-based weights may comprise a matrix of node weights.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 4 illustrates a block diagram of an exemplary client-server relationship that can be used for implementing one or more aspects of the various embodiments.

Figure 1A:
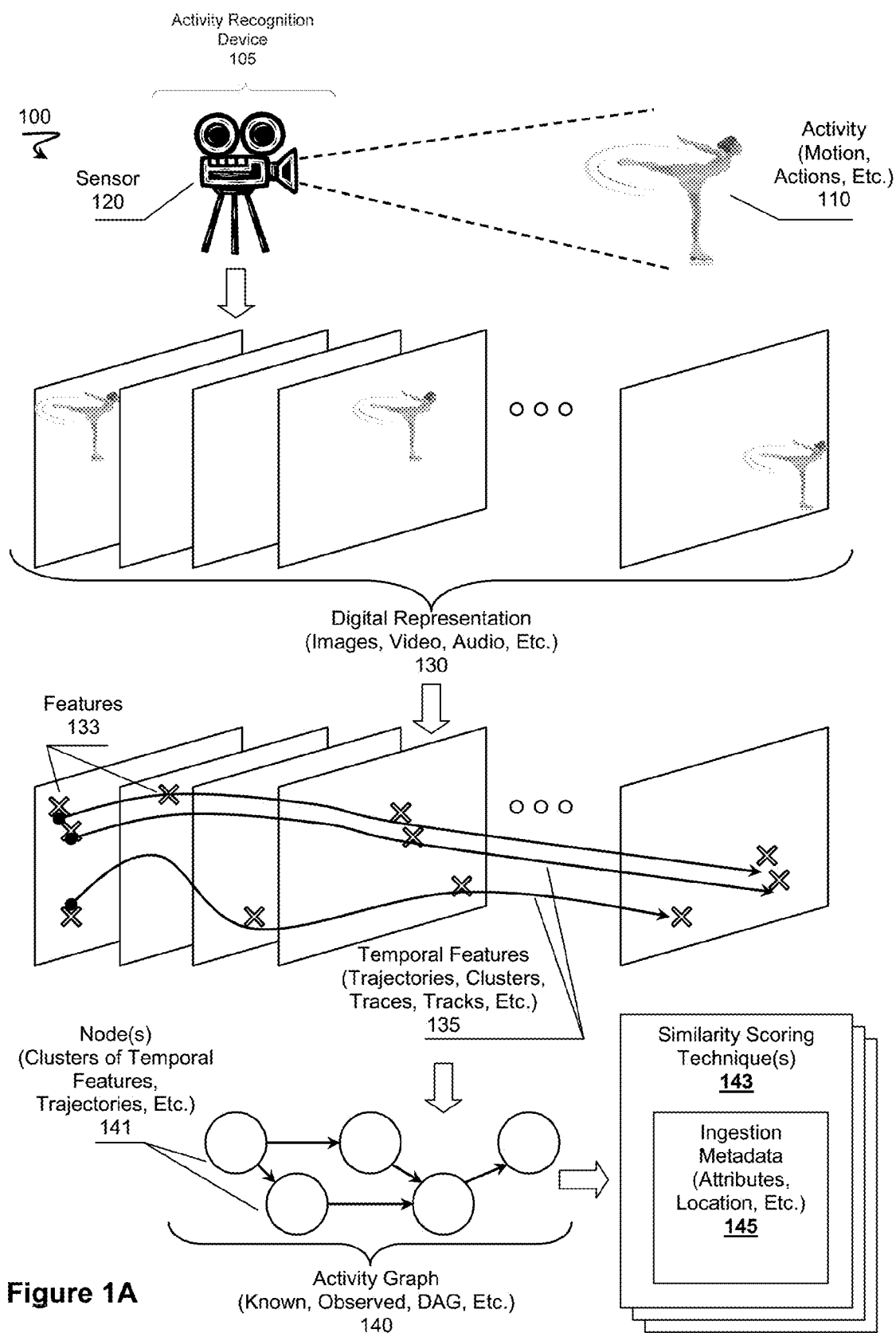
FIG. 1A is a schematic overview of an ingestion process for activity recognition in accordance with an embodiment.

While the invention is described with reference to the above drawings, the drawings are intended to be illustrative, and other embodiments are consistent with the spirit, and within the scope, of the invention.

DETAILED DESCRIPTION

The various embodiments now will be described more fully hereinafter with reference to the accompanying drawings, which form a part hereof, and which show, by way of illustration, specific examples of practicing the embodiments. This description may, however, be embodied in many different forms and should not be construed as limited to the embodiments set forth herein; rather, these embodiments are provided so that this description will be thorough and complete, and will fully convey the scope of the invention to those skilled in the art. Among other things, this description may be embodied as methods or devices. Accordingly, any of the various embodiments herein may take the form of an entirely hardware embodiment, an entirely software embodiment or an embodiment combining software and hardware aspects. The following description is, therefore, not to be taken in a limiting sense.

Throughout the description and claims, the following terms take the meanings explicitly associated herein, unless the context clearly dictates otherwise:

The phrase "in one embodiment" as used herein does not necessarily refer to the same embodiment, though it may. Thus, as described below, various embodiments of the invention may be readily combined, without departing from the scope or spirit of the invention.

As used herein, the term "or" is an inclusive "or" operator, and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the description, the meaning of "a," "an," and "the" includes plural references, and the meaning of "in" includes "in" and "on."

The following discussion provides many example embodiments of the inventive subject matter. Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, engines, controllers, modules, or other types of computing device structures operating individually or collectively. One skilled in the art should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the description as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the description should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the description herein is deemed to contain the group as modified, thus fulfilling the written description of all Markush groups used in the appended claims.

One should appreciate that the disclosed techniques provide many advantageous technical effects including reducing computational overhead on a device recognizing an activity. Thus, a computing device is enabled to process digital imagery data to determine if the observed features in the data appear to represent known activities. The computing device is able to process substantial amounts of digital data well beyond the capability of a human being.

The disclosed approach provides infrastructure for a computing device to recognize one or more activities represented in a digital representation of a scene. The activities could include one or more activities across a broad spectrum of action. Example activities include plays, sports, shopping, game play, military training, physical therapy, or other types of behaviors. It should be appreciated that the disclosed techniques also apply to recognizing non-human activities and object interactions. For example, non-human activities and object interactions include vehicular activities, robotic or swarm interactions, activities of geological systems over time, or other types of activities and object interactions.

Activities can be recognized on a contextual basis through the use of activity graphs. An activity graph is a data structure in memory comprising nodes and edges that represent a corresponding activity, preferably through time (e.g., over a time period or within a timeframe). An observed activity can be converted to an observed activity graph, which is then compared to known activity graphs. The observed activity graph can be assigned scores based on how similar the observed activity graph is to the known activity graphs (i.e., activity graphs of previously recognized activities). Further, the manner in which the observed activity graph is scored can depend on the context of the observation.

FIG. 1A is a schematic overview of an ingestion process for activity recognition in accordance with an embodiment. Process 100 illustrates various operations of activity recognition device 105 during the act of recognizing an observed activity. In the example shown, sensor 120 (coupled with, or included within, activity recognition device 105), observes activity 110 by sensing an environment of activity 110. Activity 110 could comprise various digitally observable actions or interactions among multiple objects. Although a single sensor 120 is shown (e.g., a video camera sensor), sensor 120 may represent one or more sensors capable of converting observations of an activity into digital representation 130, possibly according to multiple data modalities (i.e., according to multiple modes of existence, experience or expression). Example data modalities that could be represented in digital representation 130 include video data, audio data, tactile data, kinesthetic data, temperature data, kinematic data (e.g., motion, velocity, acceleration, etc.), radio signal data, or other types of data.

For the sake of clarity and ease of understanding, digital representation 130 comprises video data in the following discussion. However, one skilled in the art will appreciate that digital representation 130 may comprise any combination of video, still image, audio, accelerometer or other data. As such, the embodiments herein, while exemplary, are not intended to be exhaustive or limiting with respect to recognizing activities from digital representations including various other types of data. For example, digital representation 130 also could include accelerometery data from accelerometers disposed within a glove. The accelerometery data could then represent hand gestures (e.g., sign language, commands, etc.), which can be observed.

In the example shown, an ice skater is illustrated as moving around an environment. Digital representation 130 comprises a video data stream with a number of frames, wherein the ice skater may be located in a different location from frame-to-frame. The ice skater can be considered to be tracing out a volume in an (X, Y, T) space, where T corresponds to time, where X and Y represent the 2D space of the image frames. The volumetric space traced by the ice skater over time could include other dimensions as well, such as, e.g., depth relative to a camera, orientation, audio amplitude, or other dimensions.

Activity 110 is ingested by using one or more feature detection algorithms to generate a plurality of features 133 from digital representation 130. Example feature detection algorithms for processing frames of video data include scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithms. Temporal features 135 represent features 133 whose location has been tracked through time, possibly varying with time. For example, temporal features 135 might move in the volumetric space of a digital representation as time passes, might appear or disappear, fade into or out of existence, shift from one type of value (e.g., descriptor value) to another, or exhibit other types of temporal qualities. An example temporal feature might be the position of a feature 133 over several frames, forming a trajectory, i.e., a path in (X, Y, T) space. To achieve better insensitivity to noise and variations, another example of temporal features 135 includes clusters of trajectories that share similar motion and spatial proximity.

The temporal features 135 are converted into one or more activity graphs 140 comprising nodes 141 that represent clusters of temporal features 135. Activity graphs 140 can describe temporal or spatial relationships among comparable events in time (e.g., a motion, a sound, etc.). Thus, a node 141 is a signal that exists in time that can be compared to other signals (e.g., other nodes) by a method of comparison. For example, activity graph 140 could comprise a directed acyclic graph (DAG) as proposed by Wang et al., "Directed Acyclic Graph Kernels for Action Recognition", 2013 IEEE International Conference on Computer Vision (ICCV) (hereinafter referred to as "Wang 2013"). However, the directed acyclic graphs described in Wang 2013 lack sufficient information for contextual recognition. This deficiency is remedied by the various embodiments described herein.

Activity graph 140 can be represented in memory as an N×N matrix, where N is the number of nodes 141 in the graph. The matrix, in the case of a DAG, can be asymmetric where a value in a cell indicates that one node is connected to another node via a directed edge. For example, a matrix cell (3, 5) might have a value of 2 indicating that node 3 connects to node 5 via an edge of length 2 (arbitrary units) running from node 3 to node 5. However, a matrix cell (5, 3) might have a value of 0 or NULL indicating that there is no edge in the reverse direction.

An activity graph can be constructed to indicate causality of temporal nodes 141 (clusters of temporal features 135). For example, Wang 2013 describes constructing directed acyclic graphs (DAG) by creating directed links between two temporal nodes that are spatial and temporal neighbors, but do not explicitly overlap in time. Thus the DAG encodes only the explicit causal relationship, e.g., "Node_A precedes Node_B" or "Node_B follows Node_A". However, more complex graph relationships than contemplated in Wang 2013 could be encoded to allow for more meaningful comparisons in specific domains or for specific contextual inputs. For example, if an object identity is known, nodes relating to a known object in a scene can be connected, even if the nodes do not appear as spatial neighbors in the space-time volume of a video data stream.

The DAG described in Wang 2013 is selected in order to leverage a proposed random walk graph kernel, whose operation is limited to DAGs. Random walk graph kernels interpret the similarity between two graphs by counting the number of common paths through the graphs. The generalized random walk graph kernel proposed by Wang 2013 enables a comparison of DAGs where node comparisons along paths are allowed to have continuous similarity values in place of binary (similar or different) decisions. Other approximate graph kernels can be used for non-DAGs, but at the cost of increased computational burden and greater sensitivity to graph topology errors. Further, edge weights (which are not discussed in Wang 2013) can be used to represent a strength or confidence in node relationships within an activity graph. These confidences may, for example, be based on a known likelihood of co-occurrence of certain audio and video signals in a specific environment, context or location. Confidences may also represent expected independent action between known or recognized objects.

In an embodiment, activity graph 140 further includes additional information for activity recognition based on contextual scoring techniques. For example, each activity graph 140 may include one or more similarly scoring techniques 143 that could be applied based on a context, as determined from ingestion metadata 145 (e.g., metadata related to observed activity attributes, location, time-of-day, etc.).

Similarity scoring techniques 143 include digitally encoded or implemented algorithms, modules, kernels, or other procedures executable by a processor by which the similarity between an observed activity graph and a known activity graph can be derived. Example similarity scoring techniques include a node-by-node analysis, measuring a Euclidean distance, a radial basis function (RBF), a Chi-Square kernel, or other techniques, possibly based on a node-by-node comparison. It should be noted that some embodiments have activity graphs 140 that include only one type of similarity scoring technique, while other embodiments have activity graphs 140 that include many different types of similarity scoring techniques.

In some embodiments, each of similarity scoring techniques 143 can further include a set of node context-based weights indicating how each node 141 (or corresponding edges) should be weighted when the similarity scoring technique is applied. For example, within the context of ice skating, only one similarly scoring technique 143 may be available based on the ingestion metadata 145. However, that one similarity scoring technique might have several different sets of node context-based weights. Each set might weight nodes differently to strengthen or weaken respective nodes. In a context of ice dancing, for example, nodes related to hand movement or facial expressions might be strengthened. While in the context of ice hockey, body or leg movement nodes might be strengthened while nodes relating to facial expressions might be down-weighted, as facial expressions might not be as important in ice hockey relative to ice dancing. In situations where multiple sensor modalities are being used, the weights can be utilized to reflect the relative confidence of data coming from each sensing modality. For example, in a context where a camera (sensor) is shaking rapidly, nodes comprised of temporal features derived from video data may be less reliable due to motion blur, thus their influence in activity comparisons may be decreased by down-weighting video-based nodes.

The sets of node context-based weights could take on the form of a vector having N members where N is the number of nodes. Each value member in the vector may indicate a node's contribution when applying the corresponding similarity scoring technique 143. Further, the sets of node context-based weights could take on the form of an N×N matrix that has the same dimensionality of a matrix that represents activity graph 140. In such case, each value in the cells of the matrix may represent a contribution of the corresponding edge to the similarity scoring technique 143.

Aside from weighting edges and nodes in the graph, similarity scoring techniques may vary according to a type of data at a node 141. For example, in a case where a temporal feature is encoded as a histogram-based descriptor, a Chi-squared or histogram intersection kernel may be more appropriate to compute node similarities. In another example, a node 141 may comprise a descriptor vector that includes one of physical units, pixels, audio intensities, or moments of such units. In such cases, a radial basis function such as a Gaussian kernel may be more appropriate to compute similarity. Further, based on the features used and the amount of sensor noise, kernel parameters, e.g., the sigma of a Gaussian kernel, may be tuned differently. For example, features derived from pixels may require different kernel parameters than features derived from depth measurements (e.g., in meters). As another example, when comparing audio features in the context of a quiet environment, a slightly smaller sigma parameter in the Gaussian kernel may be used to require closer (i.e., stricter) matches at the cost of more sensitivity to noise. In a loud environment that must be more insensitive to noise, the sigma parameter may be increased.

Ingestion metadata 145 includes information that relates to a purpose associated with the ingestion of activity 110 (e.g., a reason for the ingestion) and indicates which similarity scoring techniques 143 would likely be most relevant. Ingestion metadata 145 may comprise automatically generated information or manually generated information. With respect to automatically generated information, one or more object recognition techniques could be applied to identify objects within the environment of activity 110 in order to generate ingestion metadata 145, including names, object classifications, identifiers, locations, sizes, shapes, colors, times of year/seasons, temperatures, make, model, or other information. Example object recognition techniques that may be suitably adapted for use with the inventive subject matter are disclosed in U.S. Pat. No. 7,016,532 to Boncyk et al. titled "Image capture and identification system and process", filed Nov. 5, 2001; U.S. Pat. No. 7,477,780 to Boncyk et al. titled "Image capture and identification system and process", filed Nov. 5, 2002; U.S. Pat. No. 7,680,324 to Boncyk et al. titled "Use of image-derived information as search criteria for internet and other search engines", filed Aug. 15, 2005; U.S. Pat. No. 7,565,008 to Boncyk et al. titled "Data capture and identification system and process", filed Jan. 26, 2006; and U.S. Pat. No. 7,881,529 to Boncyk et al. titled "Data capture and identification system and process", filed Jul. 20, 2009. Further, ingestion metadata 145 may be selected to correspond to similarity scoring techniques 143, e.g., by a user via an interface (e.g., a web page, application, API, etc.). Thus, ingestion metadata 145 could comprise domain-specific attributes (e.g., attributes related to a medical domain, health care domain, sports domain, gaming domain, shopping domain, etc.), object attributes (e.g., type of object, name of object, etc.), environment or context attributes (e.g., location attributes, time attributes, position attributes, orientation attributes, etc.) or other types of attributes.

In preferred embodiments, ingestion metadata 145 comprises data that adheres to a defined attribute namespace (i.e., a standardized nomenclature). For example, ingestion metadata 145 could comprise attribute-value pairs describing relevant conditions when the corresponding similarity scoring technique would be applicable. For example, a "location" attribute may include a GPS coordinate, address, zip code, or other value. Another example attribute could involve intensity and frequency of device motion, or average decibel level recorded by the microphone. Such attributes could be used, for example, to down-weight the importance of features extracted from video or audio channels, respectively, so that their influence on overall activity graph similarity is decreased in contexts where the data channels may be less reliable. The attribute-value pairs could be represented within XML, YAML, or JSON formats for easy transport across network links (e.g., cellular networks, Internet, LAN, WAN, wireless connection, Bluetooth® connections, etc.). In various embodiments, a defined attribute namespace allows for comparing ingestion metadata 145 to device context in field observations.

Given the ingestion metadata 145 relating to activity 110, activity graphs 140 along with similarity scoring techniques can be stored in an activity database. The database may comprise a network accessible database (e.g., SaaS, IaaS, cloud, web service, etc.), a file system, a data structure in memory of a computing device, or other data store.

Figure 1B:
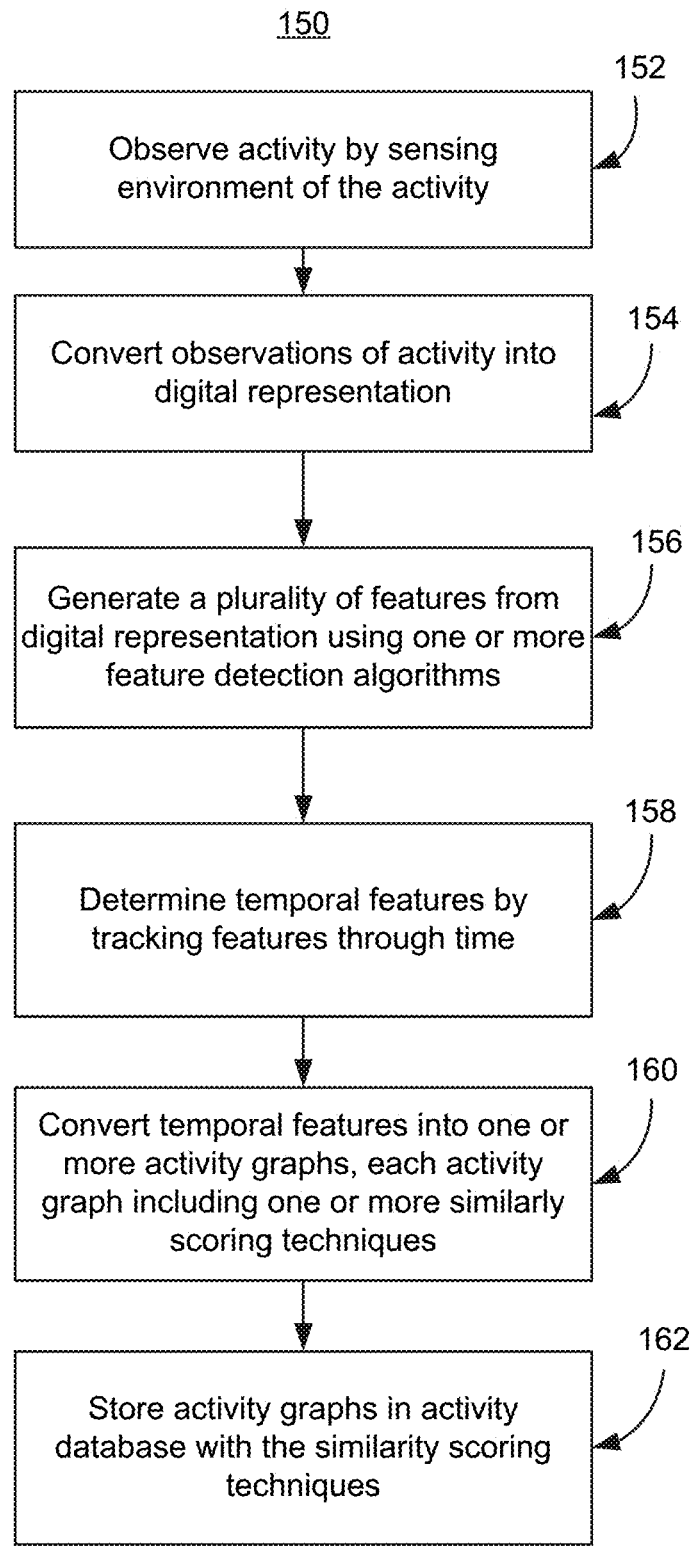
FIG. 1B illustrates a flow diagram of example operations of an ingestion process for activity recognition in accordance with an embodiment.

FIG. 1B illustrates a flow diagram of example operations of an ingestion process for activity recognition in accordance with an embodiment. It should be appreciated that method 150 is executed by one or more computing devices configured to or programmed to have the disclosed roles or responsibilities of an activity recognition device, such as activity recognition device 105. For example, activity recognition device 105 may comprise a client device, including a cell phone, kiosk, personal data assistant, tablet computer, toy, vehicle, web camera, or other type of computing device. Further, activity recognition device 105 may include a sensor, such as sensor 120, which may comprise an image capture device (e.g., a video camera or a gaming console) equipped to capture image frames of video data.

At step 152, an activity is observed by sensing an environment of the activity. For example, the activity may comprise various digitally observable actions or interactions among multiple objects.

At step 154, observations of the activity are converted into a digital representation, possibly according to multiple data modalities (i.e., according to multiple modes of existence, experience or expression). Example data modalities that could be represented in the digital representation include video data, audio data, tactile data, kinesthetic data, temperature data, kinematic data (e.g., motion, velocity, acceleration, etc.), radio signal data, or other types of data.

At step 156, a plurality of features is generated from the digital representation using one or more feature detection algorithms. Example feature detection algorithms for processing frames of video data include scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithms.

At step 158, temporal features are determined by tracking features through time. For example, the temporal features might move in the volumetric space of a digital representation as time passes, might appear or disappear, fade into or out of existence, shift from one type of value (e.g., descriptor value) to another, or exhibit other types of temporal qualities.

At step 160, the temporal features are converted into one or more activity graphs comprising nodes that represent clusters of temporal features, wherein each activity graph includes one or more similarly scoring techniques that may be applied based on a context, as determined from ingestion metadata. For example, the similarity scoring techniques may comprise a node-by-node analysis, measuring a Euclidean distance, a radial basis function (RBF), a Chi-Square kernel, or other techniques, possibly based on a node-by-node comparison.

At step 162, the one or more activity graphs are stored in an activity database along with the similarity scoring techniques, as well as along with associated metadata.

Figure 2:
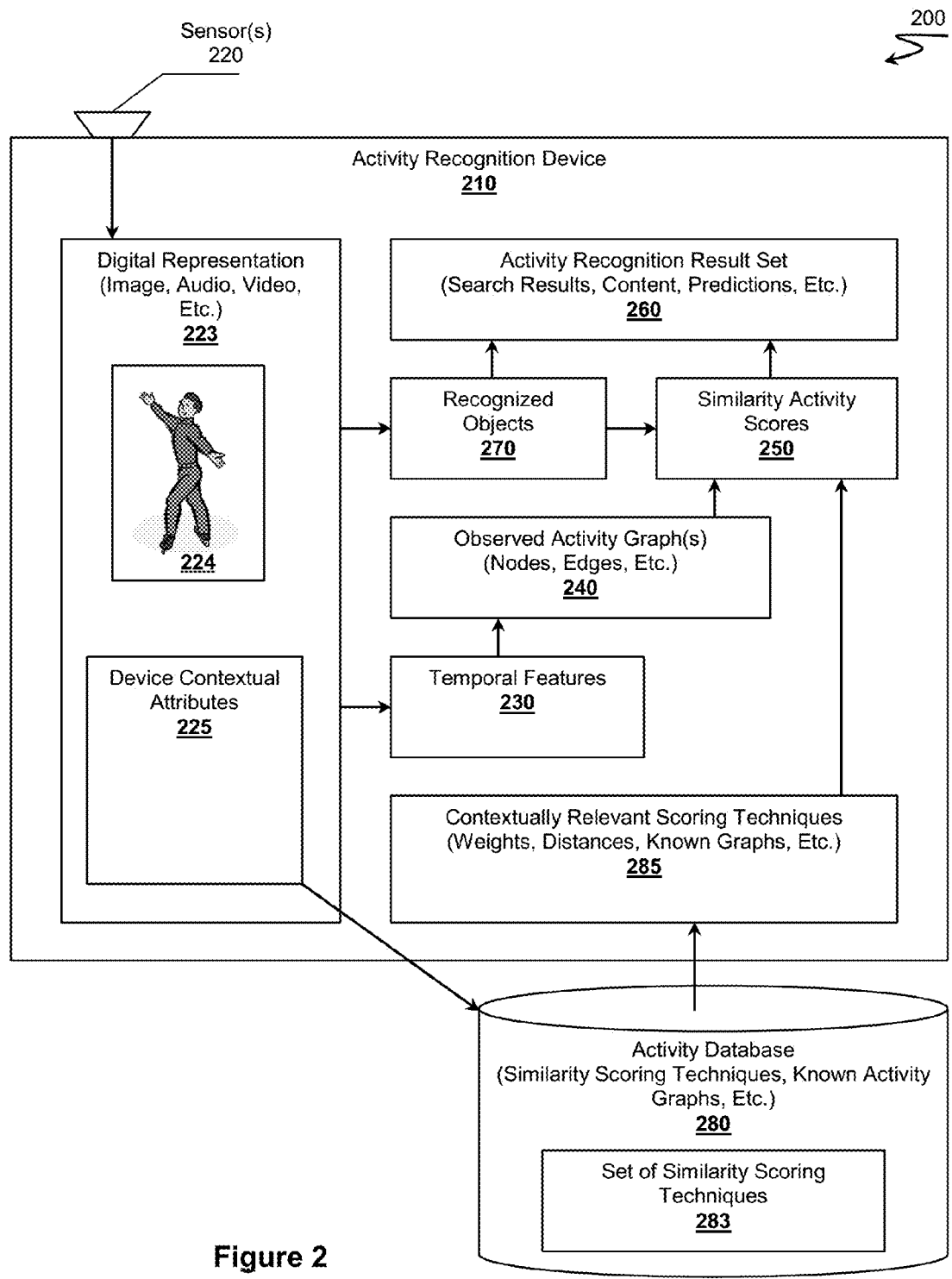
FIG. 2 is a schematic overview of an activity recognition system in accordance with an embodiment.

FIG. 2 is a schematic overview of an activity recognition system in accordance with an embodiment. Activity recognition system 200 leverages known activity graph information to recognize observed activities in the field. Activity recognition system 200 comprises activity database 280 and activity recognition device 210. Activity recognition device 210 represents a computing device including one or more modules (e.g., software instructions stored in non-transitory computer readable memory and a processor able to execute the instructions) configured to perform one or more of the various embodiments. Example computing devices that could operate as activity recognition device 210 include a tablet computer, personal computer, server, web service server, virtual machine, cloud-based computer system (e.g., one or more servers supporting IaaS, SaaS, PaaS, etc.), camera, cell phone, kiosk, appliance, vehicle, aircraft, robot, game device, surveillance system, toy, or other type of computing device.

Activity database 280 comprises one or more modules having a persistent memory capable of storing known activity graph information, including one or more similarity scoring techniques 283. In some embodiments, activity database 280 comprises a separate computing device accessible over a network connection. For example, activity database 280 could comprise a web service system that responds to contextual queries by providing results sets having activity graph information, activity graph data objects and similarity scoring techniques 283, or other result sets relating to known activities. In other embodiments, activity database 280 could comprise a data structure stored in a memory component of activity recognition device 210, e.g., where known activity graphs or similarity scoring techniques 283 are stored according a tree structure organized hierarchically based on corresponding ingestion metadata, nodes, or other schema. Activity database 280 can be populated with the various activity graph objects based on the techniques discussed with respect to FIG. 1A.

Activity recognition device 210 is configured with multiple modules for activity recognition. For ease of understanding, the following discussion will present the activity recognition device 210 capabilities from the perspective of a mobile device; e.g., a smart phone or tablet computer. Activity recognition device 210 is coupled with sensor 220 which is capable or configured to capture digital representation 223. For example, a user could direct a camera-equipped cell phone to capture a video sequence digital representation of a male ice skater 224. It should be appreciated that sensor 220 could represent multiple sensors, each able to capture a different data modality. Thus, digital representation 223 can comprise multiple layers of data modalities including image data (e.g., ultrasound, infrared, visible spectrum, etc.), video data, audio data, tactile data, kinesthetic data, temperature data, kinematic data, depth of field data, 3D registration data, radio or wireless data, IMU data, or other data modalities. Each modality could give rise to its own activity graph or be included in activity graphs that combine sets of sensing modalities, as shown in FIG. 1A.

In preferred embodiments, digital representation 223 includes device contextual attributes 225 that reflect the nature of circumstances under which activity recognition may take place. In some scenarios, device contextual attributes 225 reflect the circumstances relating to the actual capturing of digital representation 223. In other scenarios, device contextual attributes 225 might reflect the circumstances in which activity recognition device 210 is operating. Still further, device contextual attributes 225 might reflect multiple scenarios. For example, in an embodiment where digital representation 223 represents a video of a medical procedure, device contextual attributes 225 might include contextual attributes that closely relate to when the procedure is performed, possibly including information about the procedure, the health care provider, the location of the procedure (e.g., hospital, operating room, GPS coordinates, etc.), or other information. Additionally, the video might be used for training purposes after the procedure. In such a case, device contextual attributes 225 might include information about a trainee, teacher, results of the procedure, or other factors that pertain to activity recognition with respect to training. Thus, device contextual attributes 225 could have attributes associated with activity recognition device 210, a capturing device, or other device. In the example presented in FIG. 2, device contextual attributes 225 are representative of the context of activity recognition device 210, which is a cell phone capturing a video of a male ice skater 224.

Device contextual attributes 225 can take on a broad spectrum of information relating to device context. In preferred embodiments, device contextual attributes 225 adhere to a common namespace (i.e., a standardized nomenclature) with activity ingestion metadata associated with known activity graphs. This approach is advantageous because it allows for establishing matching criteria between a device context and known activity graphs tagged with similar ingestion metadata. Therefore, device contextual attributes 225 could also comprise sets of attribute-value pairs with respect to ingestion metadata.

Activity recognition device 210 is configured to obtain digital representation 223 of a scene according to one or more techniques. In the example shown, digital representation 223 is obtained as sensor data from sensor 220 (e.g., a camera, microphone, accelerometer, etc.). In other embodiments, digital representation 223 could be obtained over a network. For example, a sporting event, such as an ice skating event, may be broadcast over a cable network or wireless network, and a consumer may record the ice skating event using a DVR device or a computer, such that the computer or DVR device is activity recognition device 210.

In an embodiment, activity recognition device 210 can use device contextual attributes 225 as a query to access one or more sets of similarity scoring techniques 283 or other known activity graph object information. The query can be converted into device context criteria indicating the boundaries of a relevant device context in a common attributes namespace. Activity database 280 can respond to the query with contextually relevant scoring techniques 285 that satisfy the device context criteria. It should be appreciated that activity recognition device 210 can also receive one or more known activity graph objects having attributes that also satisfy the query. By submitting the query to activity database 280, activity recognition device 210 may select context relevant scoring techniques 285 from the set of similarity scoring techniques 283.

In an embodiment, activity recognition device 210 analyzes digital representation 223 to generate a plurality of temporal features from digital representation 223. For example, the temporal features may be generated according to one or more feature detection algorithms used to generate the known activity graphs, as described with respect to FIG. 1A. Temporal features 230 include features or descriptors that have a temporal aspects, possibly including SIFT, BRISK, SURF, FAST, BRIEF, Harris Corners, Edges, DAISY, GLOH, HOG, EOG, TILT, or other types of features that can have a temporal nature. For example, temporal features 230 could comprise clusters of trajectories of features across frames of a video data stream.

In some embodiments, activity recognition device 210 can further recognize objects in digital representation 223 using the generated temporal features. The temporal features, or their descriptors, can be used to retrieve object information (e.g., name, identity, shape, color, content, etc.) related to recognized objects 270. For example, the object information can be used to further determine device contextual attributes 225, refine the activity recognition process, or filter a results set.

Activity recognition device 210 establishes at least one observed activity graph 240 having nodes constructed from clusters of temporal features 230. Observed activity graph 240 is preferably constructed in the same manner in which the known activity graphs were established in FIG. 1A above. As discussed previously, Wang 2013 describes one technique for constructing directed acyclic activity graphs. Thus, in an embodiment, both the known activity graphs and observed activity graph 240 may comprise directed acyclic graphs, wherein the nodes of the directed acyclic graphs include clusters of feature trajectories. However, one skilled in the art will appreciate that other types of activity graphs are also possible.

Activity recognition device 210 calculates similarity activity scores 250 for observed activity graph(s) 240 as a function of the set of contextually relevant scoring techniques 285. It should be appreciated that more than one known activity graph might be contextually relevant to the current activity recognition task and that each activity graph might have multiple contextually relevant scoring techniques 285. Further, each activity graph could have different scoring techniques based on the contextual information. By reducing or filtering the number of possible known activity graphs to those that are contextually relevant, the computational resources necessary to provide a result are reduced.

Similarity activity scores 250 can be calculated based on the one or more relevant scoring techniques (e.g., a Euclidean distance, a Radial Basis Function (RBF), a Chi-Square kernel, etc.) such as based on a function of the nodes within observed activity graph 240 and within the known activity graphs. The resulting scores may indicate a ranking of known activity graphs that are most similar to observed activity graph 240 with respect to a current context. It should be further appreciated that such a ranking also reflects context. In some embodiments, the similarity activity scores 250 can also be calculated based on node context-based weights (e.g., a matrix of weights, etc.). As such, activity recognition device 210 can recognize an observed activity as being similar to one or more known activities.

Based on similarity activity scores 250, activity recognition device 210 may access activity recognition result set 260. Activity recognition result set 260 represents digital data that enables at least one further action based on recognition of the observed activity. The data, e.g., search results, could be ranked according the similarity activity scores 250 or based on the techniques, including Ranking SVM (support vector machine). For example, activity recognition results could include an address (e.g., URL, URI, file handle, IP address, etc.), an activity identifier, a search result, a recommendation, an anomaly, a warning, a segmentation, a command, a ranking, context relevant information, content information, a promotion, an advertisement, or other types of content or commands that can be bound to recognized activity graphs.

In some embodiments, known activity graphs can be categorized into different classes. In such embodiments, activity recognition device 210 can be further configured to generate a classification of the observed activity based on similar activity scores 250. For example, a known activity graph could be classified into one or more domains, e.g., sports, context nominal behaviors, driving, etc. Activity recognition device 210 may then assign a classification to observed activity graph 240 and include the classification as part of activity recognition result set 260. In some cases, classification information may allow for charging third-parties for access to class-based recognition activity events. For example, during a televised sporting event, an advertiser might purchase exclusive rights to present advertisements when a specific activity, e.g., a touchdown or a home run, is observed by a consumer's cell phone.

In some embodiments, known activity graphs may include temporal information that indicates a flow of multiple actions that string together or combine to form an overarching activity. Therefore, observed activity graph 240 might not perfectly align with known activity graphs, but might better align with portions of the known graphs where the portions of the known graphs could be considered sub-activities or actions. In such cases, activity recognition device 210 could be configured to predict a next action within an observed activity based on the similarity activity scores 250. The scores could indicate a probability of the next action matching a next action within the known activity graphs. Thus, activity recognition result set 260 could include a prediction with respect to observed activity graph 240. As a use case, consider a scenario where a computer game AI is instrumented with the disclosed techniques. The AI can observe activities of the players. When the observed activities appear to match a portion of known activities, the AI could implement an evasive maneuver that attempts to anticipate the players' next action based on what would be expected according to the known activities.

Figure 3:
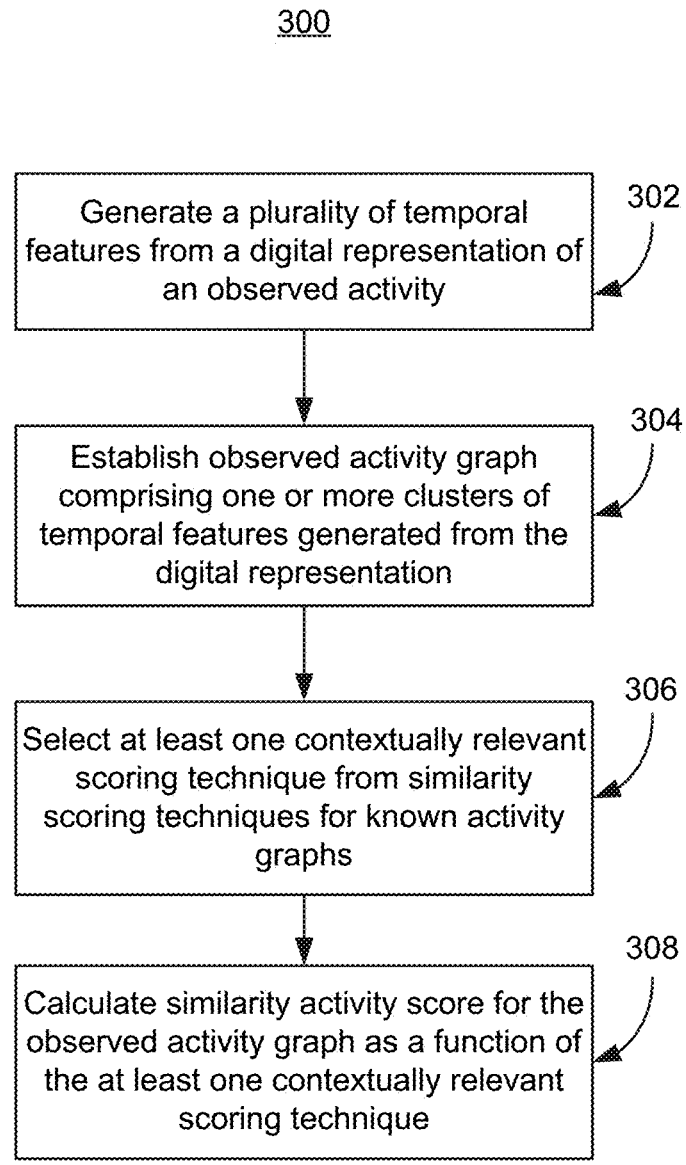
FIG. 3 illustrates a flow diagram of example operations of an activity recognition system in accordance with an embodiment.

FIG. 3 illustrates a flow diagram of example operations of an activity recognition system in accordance with an embodiment. It should be appreciated that method 300 is executed by one or more computing devices configured to or programmed to have the disclosed roles or responsibilities of an activity recognition device, such as activity recognition device 210. For example, the activity recognition device may comprise a client device, including a cell phone, kiosk, personal data assistant, tablet computer, toy, vehicle, web camera, or other type of computer device. Further, the activity recognition device may include a sensor, e.g., sensor 220, which may comprise an image capture device (e.g., a video camera or a gaming console) equipped to capture image frames of video data.

At step 302, a plurality of temporal features is generated from a digital representation of an observed activity using a feature detection algorithm. The digital representation may comprise one or more of image data, video data, audio data, tactile data, kinesthetic data, temperature data, kinematic data and radio signal data.

At step 304, an observed activity graph comprising one or more clusters of temporal features generated from the digital representation is established, wherein each one of the one or more clusters of temporal features defines a node of the observed activity graph. For example, the nodes of the observed activity graph may comprise clusters of feature trajectories.

At step 306, at least one contextually relevant scoring technique is selected from similarity scoring techniques for known activity graphs, the at least one contextually relevant scoring technique being associated with activity ingestion metadata that satisfies device context criteria defined based on device contextual attributes of the digital representation. The similarity scoring techniques may include at least one of a Euclidean distance, linear kernel, polynomial kernel, Chi-squared kernel, Cauchy kernel, histogram intersection kernel, Hellinger's kernel, Jensen-Shannon kernel, hyperbolic tangent (sigmoid) kernel, rational quadratic kernel, multi-quadratic kernel, inverse multiquadratic kernel, circular kernel, spherical kernel, wave kernel, power kernel, log kernel, spline kernel, Bessel kernel, generalized T-Student kernel, Bayesian kernel, wavelet kernel, radial basis function (RBF), exponential kernel, Laplacian kernel, ANOVA kernel and B-spline kernel function.

At step 308, a similarity activity score is calculated for the observed activity graph as a function of the at least one contextually relevant scoring technique, the similarity activity score being relative to at least one known activity graph. In some embodiments, an activity recognition result set may be generated based on the similarity activity score.

Although aspects of Wang 2013 could be leveraged for use with respect to activity recognition, there are notable differences in the disclosed approach. The disclosed approach includes similarity scoring techniques coupled with ingestion metadata to determine which types of scoring should be applied during the recognition process.

Other differences include encoding special relationships between known nodes via graph edge weights (that may also be context sensitive), using a hierarchy of graphs to reason about semantically complex events, allowing for graph topology defined by deeper relationships than simply temporal causality and spatial proximity (for example nodes related to a certain object instance may be connected despite being at a larger temporal or spatial spacing) and allowing for data from multiple sensor modalities to be combined into a single activity graph.

In view that activities are analyzed at the graph-level or even at the node-level, the activity recognition device can recognize an activity or deviation from known activities without having access to private information. Consider the following security scenario. A public space, a mall or airport for example, might have thousands of people conducting various activities per day. The security system of the public space could operate as an activity recognition device. Based on ingested nominal activities, the security system can attempt to identify activities that do not match with known ingested activities. When objects (e.g., people, etc.) in the public space begin to deviate from the known activities (e.g., based on accelerometer data), the system can generate an alert. Of particular note, the analysis can be conducted without conducting a recognition process on particular individuals, thus ensuring privacy of the observed individuals.

Yet another possible use case includes using known activity graphs as part of a physical therapy regime. In some embodiments, a database can be constructed to store a set or spectrum of desired physical activities that span across a treatment plan. As a patient works through the program, their progress can be monitored by capturing video of the session and comparing the video to corresponding activity graphs representing desired progress. In a similar vein, the techniques could be used for training purposes (e.g., sports, military, construction, surgery, etc.). Such an approach allows for athletes to compare themselves to best-in-class athletes, statistical norms, or even to computer generated activities graphs representing an estimated entitlement for an activity, or customized or choreographed activity. Still, further known activities associated with "plays", (e.g., football plays, etc.) can be used to predict what play is likely to be deployed by a team.

Still another possible application of the various embodiments includes using known activity graphs as a template for robotic interactions. Robots can use one or more known activity graphs as instructions on how to navigate through an activity. This technique leverages the predicative aspects of the technology. For example, the robot could obtain many known activity graphs that represent variations of an acceptable path through a specific activity, such as searching for victims of a natural disaster or taking inventory in a shopping center. When the robot enters or encounters a recognized activity or circumstance, the robot can attempt to take action based on predictions generated from the variations.

The advantage of such an approach is that interactions with the robot could appear more naturalistic, rather than programmatic, due to the variations.

Observed activities can also be used to unlock content. In some scenarios, observations of an activity can trigger presentation of advertisements or promotions to consumers. In such cases, brand managers could pay a fee for having some form of exclusivity with respect to providing their brand messaging in response to recognized "purchased" activities. Rights to specific activities could be accessed in exchange for a fee based on time, exclusivity, duration, an auction, or other factors. Further, a known activity could be used as a key or security token to unlock content. When a correct activity is observed or recognized, the content could be unlocked or access could be granted.

There are a large number of possible variations associated with the disclosed techniques. In some embodiments, the activity graphs can be annotated or built from object interaction primitives by constructing nodes based the object primitives. The object interaction primitives represent a basic set of object-related actions. One primitive could comprise object persistence where the object remains stationary or unchanged over time. Another primitive could include an object transformation where a first object is changed to a second object. An object-to-object conserved interaction could represent when two objects have an interaction yet both objects remain unchanged. Still further, object segmentation could represent when one object gives rise to two objects. Yet another set of primitives might include object creation or object destruction. An object NULL interaction could be used to represent that no object is present. Very complex activity graphs can be constructed from such primitives.

In some embodiments, an activity graph can take on a hierarchical structure. At a lowest level, a node in an activity graph could represent an object interaction primitive based on a cluster of trajectories. Such an activity graph could itself represent a larger action (i.e., a complex set of object interactions) and become a node in a larger activity graph. This progression can produce increasingly higher level graphs. For example, a movie could comprise a single activity graph having sub graphs representing scenes. The scene graphs could comprise nodes that are activity graphs representing actors or object. These in turn could be comprised of nodes that are represented by object interaction primitives. This hierarchical approach provides for multi-scale analysis among different types of activities through similarity of graph structures.

The similarity scoring techniques can leverage kernel approaches, which also give rise to using known activity graphs to analyze observed activities, perhaps based on observing statistically significant numbers of activities. The kernel approach can be used for activity classification, regression (e.g., predicting actions, extrapolating, trending, etc.), clustering (e.g., crowd behaviors, consumer demographic analysis, etc.), outlier detection (e.g., anomalous behaviors, deviations from norms, etc.), ranking (e.g., ranking relative to an ideal performance of an action or event, ranking similar actions during retrieval, ranking similarity of different actions based on specific comparison criteria such as amount of motion, number of actors involved, or interplay between sensing modalities), segmentation (e.g., differentiation between the end of one action and the start of another), or other analysis techniques leveraging kernel methods.

The similarity scoring techniques can also be weighted or filtered based on selected activities or domains. For example, an observed outdoor scene may be filtered based on a domain selected, e.g., by a user or based on a GPS location, such that cars, animals or other objects not relevant to the domain are automatically filtered out in a calculation of similarity activity scores.

The disclosed techniques can be further refined to target embedded devices that have memory or processor constraints. In some embodiments, known activities graphs can have low-value nodes pruned, based on, for example, a principle component analysis (PCA). For example, nodes could be removed that lack contribution to differentiating one activity from another. Thus, the dimensionality of the graphs can be reduced or noise within a graph can be reduced by eliminating low contribution nodes.

Still images can also be used to recognize activities. In some embodiments, activity graphs may include one or more key frames that are representative of corresponding actions associated with nodes. An observed still image can be compared to such key frames to determine if the observed still image aligns with the corresponding activity graph. In some embodiments, the activity recognition device can derive features from the still image and use the features to establish a mapping of the image into a graph scale of one or more known graphs through comparing the image features to the nodes of the known activity graph. It should be appreciated that the still image could be "spread" over multiple nodes of a known graph. For example, portions of the image (e.g., a recognized object) may correspond to a node corresponding to a first time (to) while other portions (e.g., a second recognized object) may correspond to a different node at a different time (ti). Though such a convolution and calculated similarity activity scores, the activity recognition device can estimate how well the still image corresponds to a snapshot of one or more known activities.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers.

A high-level block diagram of an exemplary client-server relationship that may be used to implement systems, apparatus and methods described herein is illustrated in FIG. 4. Client-server relationship 400 comprises client 410 in communication with server 420 via network 430, and illustrates one possible division of activity recognition tasks between client 410 and server 420. For example, client 410, in accordance with the various embodiments described above, may be configured to communicate with server 420, and facilitate an activity recognition search by generating a digital representation of an observed activity and/or by sending a digital representation of an observed activity data to server 420. Server 420 may be configured to generate a plurality of temporal features from the digital representation of the observed activity using a feature detection algorithm, establish an observed activity graph comprising one or more clusters of temporal features generated from the digital representation, select at least one contextually relevant scoring technique from similarity scoring techniques for known activity graphs, and calculate a similarity activity score for the observed activity graph as a function of the at least one contextually relevant scoring technique, the similarity activity score being relative to at least one known activity graph. In some embodiments, server 420 may be further configured to receive digital representation data from client 410, conduct an activity recognition search based on the digital representation data, generate an activity recognition result set and send the activity recognition result set to client 410. One skilled in the art will appreciate that the exemplary client-server relationship illustrated in FIG. 4 is only one of many client-server relationships that are possible for implementing the systems, apparatus, and methods described herein. As such, the client-server relationship illustrated in FIG. 4 should not, in any way, be construed as limiting. Examples of client devices 410 can include cell phones, kiosks, personal data assistants, tablet computers, toys, vehicles, web cameras, or other types of computing devices.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 1B and 3, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 5:
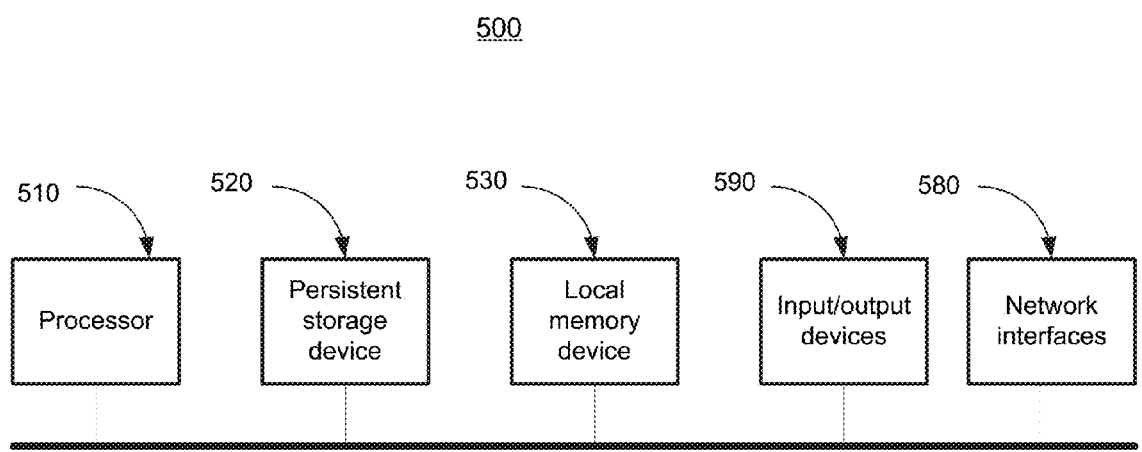
FIG. 5 illustrates a block diagram of a distributed computer system that can be used for implementing one or more aspects of the various embodiments.

A high-level block diagram of an exemplary apparatus that may be used to implement systems, apparatus and methods described herein is illustrated in FIG. 5. Apparatus 500 comprises a processor 510 operatively coupled to a persistent storage device 520 and a main memory device 530. Processor 510 controls the overall operation of apparatus 500 by executing computer program instructions that define such operations. The computer program instructions may be stored in persistent storage device 520, or other computer-readable medium, and loaded into main memory device 530 when execution of the computer program instructions is desired. For example, activity recognition device 210 and sensor 220 may comprise one or more components of apparatus 500. Thus, the method steps of FIGS. 1B and 3 can be defined by the computer program instructions stored in main memory device 530 and/or persistent storage device 520 and controlled by processor 510 executing the computer program instructions. For example, the computer program instructions can be implemented as computer executable code programmed by one skilled in the art to perform an algorithm defined by the method steps of FIGS. 1B and 3. Accordingly, by executing the computer program instructions, the processor 510 executes an algorithm defined by the method steps of FIGS. 1B and 3. Apparatus 500 also includes one or more network interfaces 580 for communicating with other devices via a network. Apparatus 500 may also include one or more input/output devices 590 that enable user interaction with apparatus 500 (e.g., display, keyboard, mouse, speakers, buttons, etc.).

Processor 510 may include both general and special purpose microprocessors, and may be the sole processor or one of multiple processors of apparatus 500. Processor 510 may comprise one or more central processing units (CPUs), for example. Processor 510, persistent storage device 520, and/or main memory device 530 may include, be supplemented by, or incorporated in, one or more application-specific integrated circuits (ASICs) and/or one or more field programmable gate arrays (FPGAs).

Persistent storage device 520 and main memory device 530 each comprise a tangible non-transitory computer readable storage medium. Persistent storage device 520, and main memory device 530, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 590 may include peripherals, such as a printer, scanner, display screen, etc. For example, input/output devices 590 may include a display device such as a cathode ray tube (CRT), plasma or liquid crystal display (LCD) monitor for displaying information (e.g., a plurality of image transformations for selection) to a user, a keyboard, and a pointing device such as a mouse or a trackball by which the user can provide input to apparatus 500.

Any or all of the systems and apparatus discussed herein, including activity recognition device 210 and sensor 220 may be performed by, and/or incorporated in, an apparatus such as apparatus 500.

One skilled in the art will recognize that an implementation of an actual computer or computer system may have other structures and may contain other components as well, and that FIG. 5 is a high level representation of some of the components of such a computer for illustrative purposes.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:
1. An activity recognition system comprising:
an activity database configured to store similarity scoring techniques for known activity graphs, each of the similarity scoring techniques being associated with activity ingestion metadata; and
an activity recognition device coupled with the activity database and configured to:

generate a plurality of temporal features from a digital representation of an observed activity using a feature detection algorithm;

establish an observed activity graph comprising one or more clusters of temporal features generated from the digital representation, wherein each one of the one or more clusters of temporal features defines a node of the observed activity graph;

select at least one contextually relevant scoring technique from the similarity scoring techniques for known activity graphs, the at least one contextually relevant scoring technique being associated with activity ingestion metadata that satisfies device context criteria defined based on device contextual attributes of the digital representation; and calculate a similarity activity score for the observed activity graph as a function of the at least one contextually relevant scoring technique, the similarity activity score being relative to at least one known activity graph.

2. The system of claim 1, wherein the activity database is further configured to store the known activity graphs.

3. The system of claim 2, wherein the activity recognition device is further configured to calculate the similarity activity score as a function of nodes within the known activity graphs and nodes within the observed activity graph.

4. The system of claim 1, wherein the activity database is stored, at least partially, in a memory of the activity recognition device.

5. The system of claim 1, wherein the activity recognition device comprises at least one of a tablet computer, personal computer, camera, cell phone, kiosk, appliance, vehicle, robot, and game device.

6. The system of claim 1, wherein the device contextual attributes and the activity ingestion metadata adhere to a common namespace.

7. The system of claim 1, wherein the activity ingestion metadata comprises domain-specific attributes.

8. The system of claim 1, wherein the activity ingestion metadata comprises object attributes.

9. The system of claim 1, wherein the activity ingestion metadata comprises at least one of location attributes, time attributes, position attributes and orientation attributes.

10. The system of claim 1, wherein the known activity graphs and the observed activity graph comprise directed acyclic graphs.

11. The system of claim 1, wherein the nodes of the observed activity graph comprise clusters of feature trajectories.

12. The system of claim 1, wherein the digital representation comprises one or more of image data, video data, audio data, tactile data, kinesthetic data, temperature data, kinematic data and radio signal data.

13. The system of claim 1, wherein the feature detection algorithm includes at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithm.

14. The system of claim 1, wherein the known activity graphs comprise activity graph primitives.

15. The system of claim 14, wherein the activity graph primitives include at least one of an object persistence, object transformation, object-to-object conserved interaction, object segmentation, object creation, object destruction and object NULL interaction.

16. The system of claim 1, wherein the known activity graphs include nodes that comprise other known activity graphs.

17. The system of claim 1, wherein the known activity graphs comprise key frames.

18. The system of claim 1, wherein the activity recognition device is further configured to generate an activity recognition result set based on the similarity activity score.

19. The system of claim 18, wherein the activity recognition device is further configured to assign a classification to the observed activity graph, wherein the classification comprises the activity recognition result set.

20. The system of claim 18, wherein the activity recognition result set comprises an activity prediction with respect to the observed activity graph.

21. The system of claim 18, wherein the activity recognition result set comprises at least one of an address, an activity identifier, a search result, a recommendation, an anomaly, a warning, a segmentation, a command, a ranking, context relevant information, content information, a promotion and an advertisement.

22. The system of claim 1, wherein the activity recognition device is further configured to establish a mapping of a static image from the digital representation into a graph space of at least one of the known activity graphs by mapping image features to nodes of the at least one of the known activity graphs.

23. The system of claim 22, wherein the activity recognition device is further configured to generate an action prediction based on the mapping and the nodes of the at least one of the known activity graphs.

24. The system of claim 1, wherein the similarity scoring techniques include at least one of a Euclidean distance, linear kernel, polynomial kernel, Chi-squared kernel, Cauchy kernel, histogram intersection kernel, Hellinger's kernel, Jensen-Shannon kernel, hyperbolic tangent (sigmoid) kernel, rational quadratic kernel, multiquadratic kernel, inverse multiquadratic kernel, circular kernel, spherical kernel, wave kernel, power kernel, log kernel, spline kernel, Bessel kernel, generalized T-Student kernel, Bayesian kernel, wavelet kernel, radial basis function (RBF), exponential kernel, Laplacian kernel, ANOVA kernel and B-spline kernel function.

25. The system of claim 1, wherein the similarity scoring techniques comprise at least one set of node context-based weights.

26. The system of claim 25, wherein the at least one set of node context-based weights comprises a matrix of node weights.

27. A method of activity recognition at an activity recognition device, the method comprising:

generating a plurality of temporal features from a digital representation of an observed activity using a feature detection algorithm;

establishing an observed activity graph comprising one or more clusters of temporal features generated from the digital representation, wherein each one of the one or more clusters of temporal features defines a node of the observed activity graph;

selecting at least one contextually relevant scoring technique from similarity scoring techniques for known activity graphs, the at least one contextually relevant scoring technique being associated with activity ingestion metadata that satisfies device context criteria defined based on device contextual attributes of the digital representation; and calculating a similarity activity score for the observed activity graph as a function of the at least one contextually relevant scoring technique, the similarity activity score being relative to at least one known activity graph.

28. A computer program product embedded in a non-transitory computer readable medium comprising instructions executable by a computer processor for activity recognition, the instructions being executable by a computer processor to execute processing comprising:

generating a plurality of temporal features from a digital representation of an observed activity using a feature detection algorithm;

establishing an observed activity graph comprising one or more clusters of temporal features generated from the digital representation, wherein each one of the one or more clusters of temporal features defines a node of the observed activity graph;

selecting at least one contextually relevant scoring technique from similarity scoring techniques for known activity graphs, the at least one contextually relevant scoring technique being associated with activity ingestion metadata that satisfies device context criteria defined based on device contextual attributes of the digital representation; and calculating a similarity activity score for the observed activity graph as a function of the at least one contextually relevant scoring technique, the similarity activity score being relative to at least one known activity graph.

\* \* \* \* \*